Oct. 8, 1940.  A. E. ANDERSEN  2,216,726
BEARING
Filed Sept. 3, 1938

INVENTOR.
ALFRED E. ANDERSEN
BY
R.D. Inogner
ATTORNEY.

Patented Oct. 8, 1940

2,216,726

UNITED STATES PATENT OFFICE 2,216,726

BEARING

Alfred E. Andersen, Brooklyn, N. Y.

Application September 3, 1938, Serial No. 228,346

2 Claims. (Cl. 308—230)

My present invention relates to bearings and, more particularly to ball bearings of the types generally referred to as radial and thrust bearings.

The main object of my invention is to provide a bearing of the type specified wherein the usual balls are replaced by one or more balls of an increased diameter so positioned with respect to the axis of the bearing, or shaft, as to eliminate to a large degree, the several defects present in bearings of the present day.

Another object of my present invention is the design of a bearing wherein only one ball of a comparatively large diameter is used and, which is adapted to rotate in a raceway positioned a slight distance from the axis of the shaft.

Figure 1:
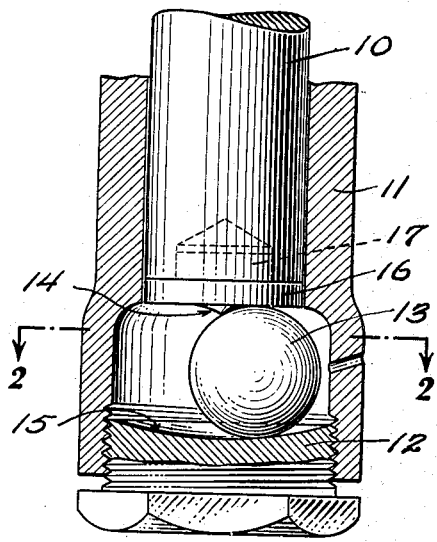
Figure 4:
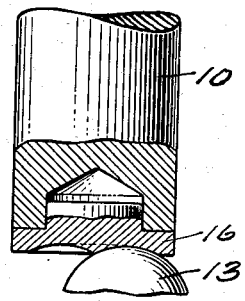
Figure 5:
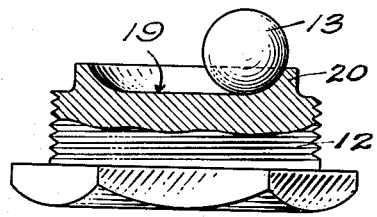
Figure 2:
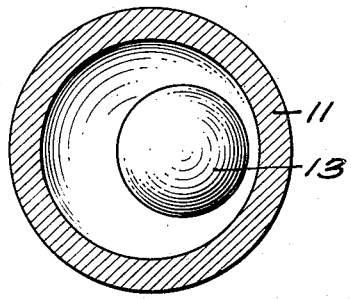
Figure 3:
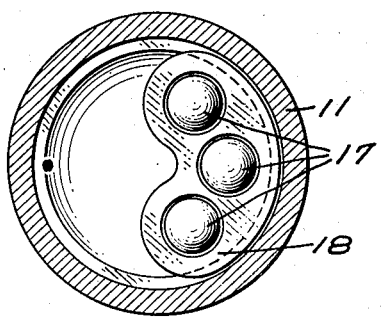

The many additional objects and advantages of my invention will be readily apparent to those skilled in the art and, from the following specifications wherein several forms of bearings are described as illustrative of the many forms to which my invention is adaptable, and which forms are illustrated in the accompanying drawing, wherein:

Figure 1 is a cross sectional view through the end of a typical thrust bearing showing my improvements incorporated therein;

Figure 2, a cross sectional view taken on line 2—2 of Figure 1;

Figure 3, a similar view of a modified form;

Figure 4, a modified form of raceway;

Figure 5, a further modified form of raceway; and

Figure 6:
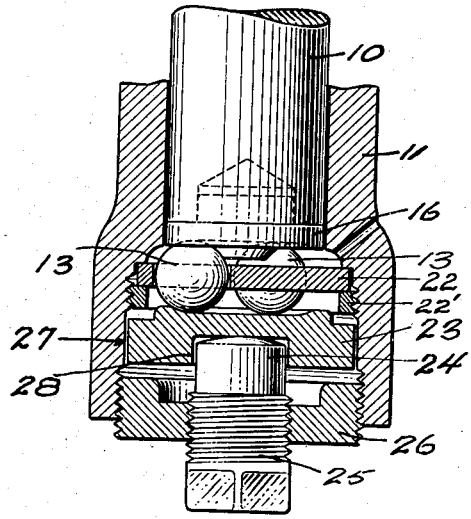

Figure 6, a cross sectional view of a combined radial and thrust bearing.

Heretofore, it has been the standard practice to provide thrust bearings, or the like, with a multiplicity of balls of such materials and size as to properly support the load or thrust, the balls being designed to travel in a raceway concentric with the circumference of the shaft but at a considerable distance from the axis of the shaft. Obviously the number of balls used together with the diameters thereof control the distance the raceway must be positioned. The disadvantages of such designs are many. For example, by the use of a multiplicity of balls of small diameter the travel of the balls is increased and consequently the rolling friction is likewise increased, thereby increasing the "fatigue" in the balls which often results in crystallization of the metal comprising the balls.

In the application of my invention to one type of thrust bearing, for example, I provide a single ball of comparatively large diameter which is designed to revolve in an orbit, or raceway, of considerably smaller diameter than is ordinarily used. To control the travel of the ball I provide the end of the shaft with a slight conical projection at the center thereof, the size of the projection and the curvature of the walls thereof being so designed as to conform to the curvature of the ball. The opposite pole of the ball may be arranged to travel in a raceway end, against a concave surface, the radius of which is designed mathematically to retain the ball against the conical projection carried by the shaft and, to prevent the ball from being thrown centrifugally against the walls of the bearing when maximum speeds are attained.

In the drawing, see Figure 1, the shaft is designated as 10, the main walls of the bearings as 11, and the lower raceway as 12. The ball 13 is arranged to rotate between the end of the shaft 10 which has the conical projection 14 carried thereby and the concave surface 15 carried by the lower raceway 12. In the drawing I have provided a cap 16, which may be hardened or case-hardened if desired, for the end of the shaft and which has a projection 17 for a press-fit union with a bore in the end of the shaft. While the use of cap 16 may be desirable, it is to be understood that the end of the shaft may be turned to provide the projection 14 for the ball and the cap 16 entirely eliminated if desired.

The lower raceway 12 may be made as shown in the form of a screw threaded plug for insertion into an internally screw threaded end of the shaft bearing, or it may be made in various well known ways whereby the play or thrust may be compensated for. In the form shown the raceway is concaved with a radius mathematically determined so as to cause the ball to hug the conical surface or projection 14 and at the same time prevent the ball from engaging the walls of the bearing under the action of centrifugal force.

In cases of actual service, I found that the use of a single large ball arranged as above described greatly reduces the travel of the ball resulting in a great decrease in the rolling friction and, that such results may quickly be determined by reference to the following formula which is a mathematical expression of the friction produced by a bearing of my design during one revolution of the shaft:

$$F = \frac{2r\pi}{P} \times fr \times P$$

wherein: $fr$=rolling friction; P=pressure; D=diameter of the ball; r=distance from shaft axis to center of ball.

In Figure 3 of the drawing I illustrate a modified view wherein 3 balls 17 are shown arranged in a group but so mounted as to give in effect the action of a single ball. Here the balls 17 are retained in proper relation by means of a cage or guide ring 18 as will be understood. One of the advantages of such a construction is the distribution of high loads but at the same time retaining the advantage of lower travelling speeds and rolling friction.

Figures 4 and 5 illustrate modifications of the ball engaging surfaces, Figure 4 showing the end of the shaft 10 recessed with a groove or raceway corresponding to the curvature of the ball to be used and, 5 illustrating the lower raceway as having a flat supporting surface 19 surrounded by a ball restraining rim 20. Either or both may be used in certain types of bearings.

Figure 6 illustrates a combined radial and thrust bearing wherein 3 balls are used but of larger diameter than the orthodox bearings and by the use of which I am able to position the balls for service at a point nearer the axis of the shaft and thereby reduce the rolling friction thereof. In the design shown the cap 16 is resorted to and a retaining ring 22 is used to maintain the correct alignment of the balls. The ring 22 is held in position by means of a threaded ring 22' screw threaded into the end of the housing.

It is well known that in bearings where more than one ball is employed, there is always a slight difference in the size of one or more of the balls, which results in the larger ball (or balls) carrying the brunt of the load. To overcome this condition I have provided the lower race with a rocking device, so as to attain a uniform load continually on the three balls, I advocate using. The lower raceway is made in two parts, first the raceway proper 23, which has a central bore 24 on its lower surface for the reception of a screw threaded plug 25 carried by the second member 26 which is arranged to be screw threaded into the shaft bearing 11. The top of the plug is slightly convexed which permits the member 23 to rock and thereby compensate for any unevenness in the size of the balls, and attaining a perfectly balanced bearing, which results in a greatly increased life of the balls as well as the races. Adjustment of play is very easily made by giving the screw plug 25 a turn in the desired direction.

The rocking raceway is given a double purchase first, at 27 the surface between 23 and housing 11 and second, at 28 between the bore in 23 and the screw plug 25. The whole bearing is so designed that lubrication is held permanently which obviates the necessity of frequent oiling.

From the foregoing, it will be seen that I have produced a new and novel bearing wherein the balls are positioned at a point quite close to the axis of the shaft which results in a reduction of the travel of the balls and also a reduction in the rolling friction thereof. Because of these results I am able to design simple and compact bearings suitable for high or low speed work and which are readily installed, and maintained.

While I have illustrated certain types of bearings, raceways and mountings I wish it clearly understood that the basic principles underlying my invention may be incorporated in other designs without departing from the spirit and scope of my invention.

I claim:

1. In a bearing the combination of a rotatable shaft, a bearing for said shaft, a raceway carried by said shaft, an adjustable plug mounted in the end of said bearing and having a raceway on its inner end, and three balls interposed between the raceways carried by said shaft and said plug, said plug comprising two members, the first carrying the raceway and having an internal bore on the lower surface for the reception of a stud carried by the second member and which stud has a convexed end portion to permit the first member to rock thereon in the event of variation in the diameter of the said balls.

2. In a bearing the combination of a rotatable shaft, a bearing for said shaft, a race-way carried by said shaft, an adjustable plug mounted in the end of said bearing and having a race-way on its inner end, and three balls interposed between the race-ways carried by said shaft and said plug, said plug comprising two members, the first carrying the race-way on its upper surface and having an internal bore terminating in a flat horizontal surface on the lower surface for the reception of a stud carried by the second member and which stud has a convexed end portion of small radius for engaging with said horizontal surface to permit the first named member to rock thereon in the event of variation in the diameter of the said balls.

ALFRED E. ANDERSEN.